Aug. 8, 1967 D. S. OLIVER 3,335,408

APPARATUS FOR DATA PROCESSING

Filed April 15, 1964 3 Sheets-Sheet 1

INVENTOR.
DONALD S. OLIVER
BY Stanley Bird
ATTORNEY

INVENTOR.
DONALD S. OLIVER
BY Stanley Belsky
ATTORNEY

APPARATUS FOR DATA PROCESSING

Filed April 15, 1964 3 Sheets-Sheet 3

INVENTOR.
DONALD S. OLIVER
BY Stanley Belsky
ATTORNEY

United States Patent Office 3,335,408

Patented Aug. 8, 1967

3,335,408

APPARATUS FOR DATA PROCESSING

Donald S. Oliver, West Acton, Mass., assignor to Itek Corporation, a corporation of Delaware Filed Apr. 15, 1964, Ser. No. 359,949
10 Claims. (Cl. 340—172.5)

Figure 1:
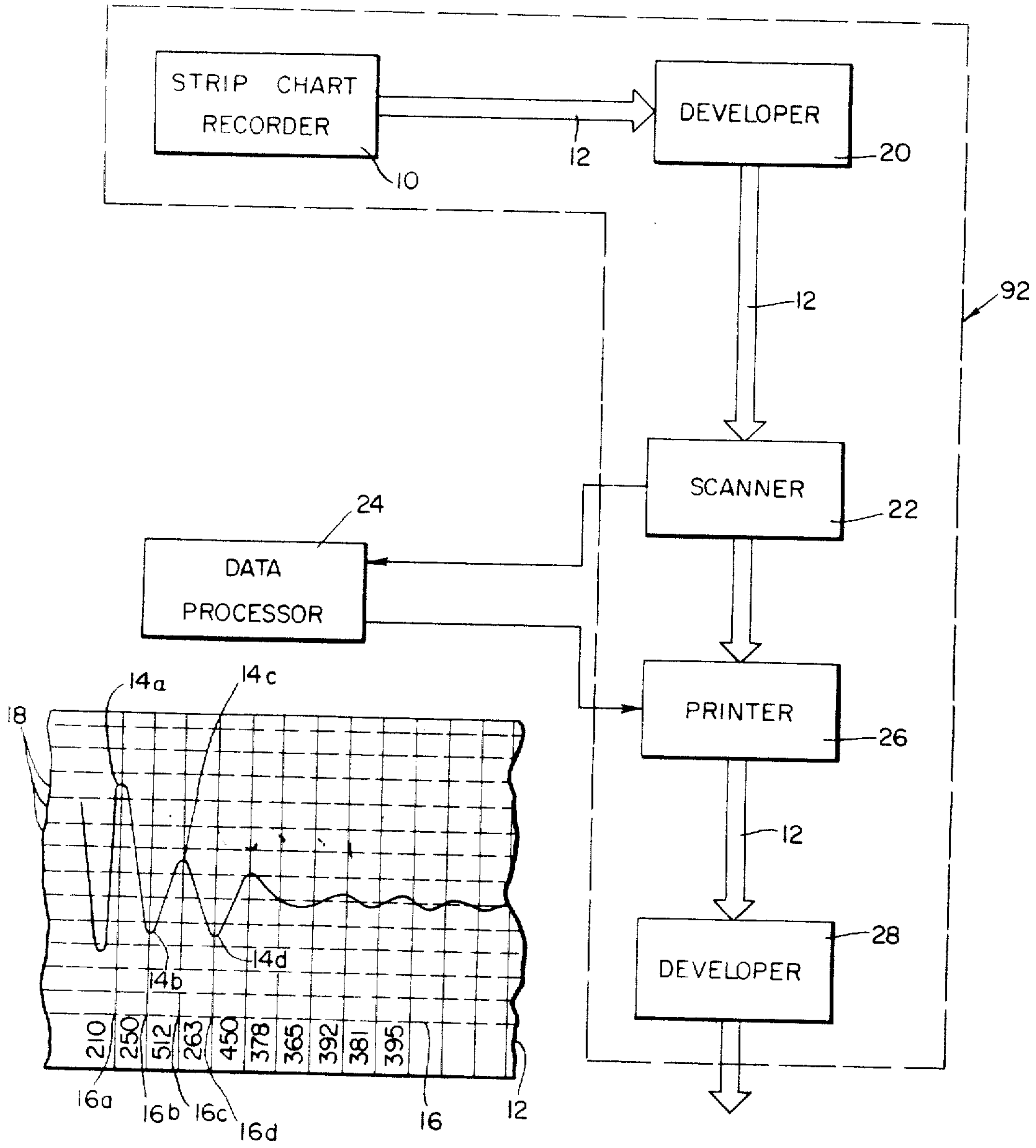

This invention relates to apparatus which provide a printed digital record of a continuously varying analog quantity. More specifically, it relates to a system which analyses the graphical output of a strip chart recorder and prints at intervals along the base line of the graph a series of numbers corresponding to the parameter represented by the graph. At each position along the base line the number printed is the value of the graph at that position. Alternatively, the number may give the value of some other function associated with the graph at that position.

A strip chart recorder is generally used to provide a graphical representation of the manner in which a monitored parameter varies as a function of time. In its most elementary form a recorder of this type incorporates a mechanism which pulls a paper strip or tape past a pen at a predetermined speed. The pen is made to move laterally across the strip according to the value of the monitored parameter. That is, at any instant, the height of the pen above a base line parallel to one edge of the strip corresponds to the measured quantity. The longitudinal movement of the strip thus results in a graph or curve whose height at any point along the strip represents the value of the parameter at the time the point passed the pen.

There are a number of more refined versions of the strip chart recorder. For example, the strip may have a photosensitive surface with the "pen" taking the form of a mirror galvanometer or similar instrument which directs a light beam at the strip. The instrument thus photographically produces the desired graphical presentation.

Strip chart recorders, particularly the modern high speed versions, record information at a very fast rate and thus the mass of information produced even in a short time is difficult for one to digest. A large factor in this problem is the requirement that one studying the graphical presentation must mentally convert the values thereof to numerical form in order to interpret it or perform certain mathematical operations such as averaging. The present invention is directed to this problem and in particular it is an object of the invention to provide apparatus which furnish a digital representation of the values recorded in analog form by a strip chart recorder.

Another object of the invention is to provide apparatus which prepare a permanent record in digital form of a time varying parameter.

Another object of the invention is to provide apparatus of the above character which furnish a digital readout which is readily correlated with the corresponding analog quantities.

A further object of the invention is to provide apparatus of the above character which do not materially increase the storage requirements for the information involved.

Other objects of the invention will in part be obvious and will in part appear hereinafter.

Figure 2A:
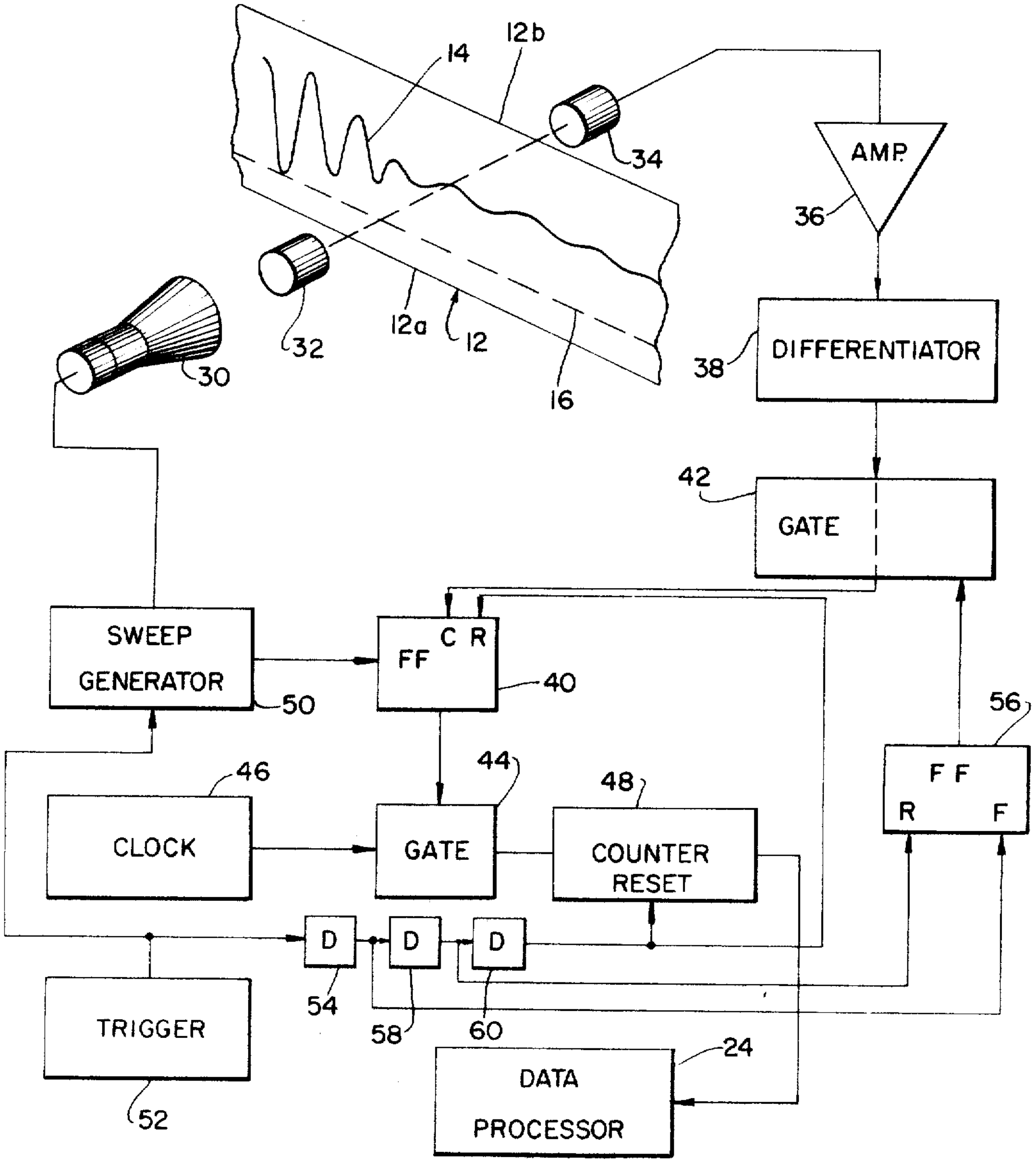
Figure 2B:
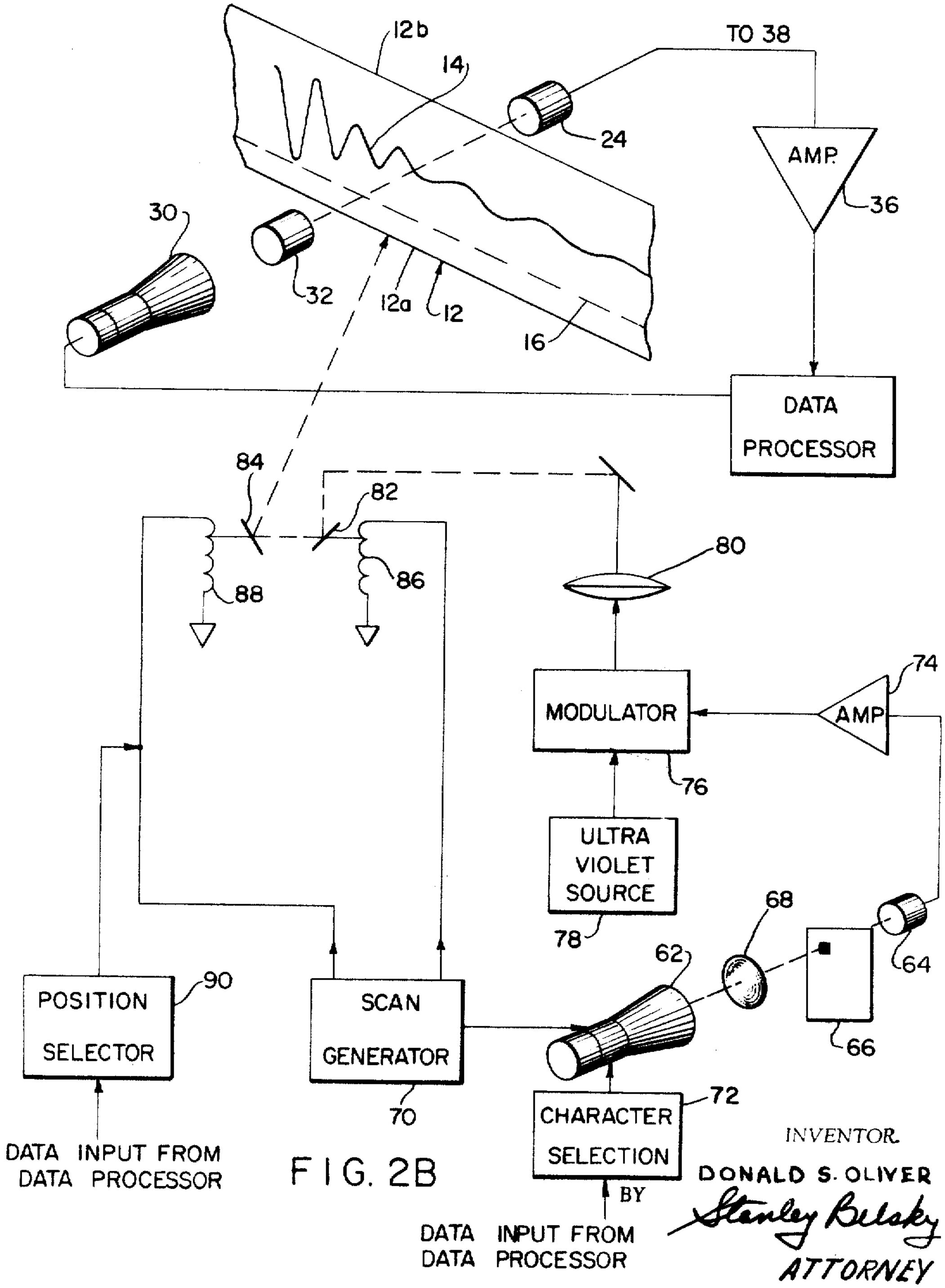

For a fuller understanding of the nature and objects of the invention, reference should be had to the following detailed description taken in connection with the accompanying drawings in which:

FIG. 1 is a schematic diagram in block form of apparatus embodying the invention, and FIGS. 2*a* and 2*b* are detailed schematic diagrams of the preferred embodiment of the invention.

In general, when used in connection with a strip chart record, the invention operates to scan the chart at periodic intervals therealong and determine at each of these points, the height of the graph above a base line or reference level. Ordinarily, this height corresponds to the quantity represented by the graph. A digital representation of the quantity is developed by the system and the resulting number (or letter or other symbol, depending on the type of coding used) is printed on the strip. The position of each number along the strip is the position of the point on the graph whose value is represented by the number.

Thus, when examining the strip one simultaneously obtains a rough pictorial view of the manner in which the monitored parameter varies, together with a more precise numerical indication of the measured quantity. Moreover, in addition to a series of numbers corresponding to the value of the monitored parameter, numbers may be printed which correspond to related quantities. Examples of such related quantities are the slope of the curve and the average value of the monitored parameter.

Although, the invention is not limited to the use of any specific technique, the preferred embodiment advantageously employs an image recording medium of the type disclosed in the commonly owned copending Berman et al. application, Ser. No. 199,211, filed May 14, 1962, the details of which are incorporated herein by reference. As disclosed therein, exposure of the surface of such a medium to an image pattern of activating radiation renders chemically reactive those portions of the surface which are struck by the radiation, thereby forming a "latent image" thereon. The activated irradiated medium is next contacted with a developer system to effect a chemical redox reaction, on such contact, between the developer system and the activated chemically reactive portions of the sensitized surface.

For example, according to the teachings of the copending Berman application, a filled or coated substrate comprising a photoconductor such as titanium dioxide is exposed to an image pattern of radiation and is then developed by simple contact with a developer system forming an image by redox reactions occurring at activated chemically reactive portions of the photoconductor. Thus, the exposed medium may be contacted with a solution containing ions of a metal such as copper, silver, mercury or gold. The ions are reduced to free metal on contact with the chemically reactive portions of the surface and these atoms plate out on the surface. Although, exposures can be used which are sufficient to cause precipitation of such an amount of free metal as will form a visible image on the copy medium, shorter exposure times can also be used. The resulting invisible, "latent developed images" can be subsequently amplified by contact with developer systems of the type known in the silver halide photographic arts, for example, those comprising silver ion in admixture with a reagent forming a redox system such as hydroquinone. Developer systems of this type tend to deposit further free metal on surface where free metal is already present, and can be used in the present invention to amplify a prior formed "latent developed images" or can be used alone in single developing step to form a visible image directly.

The photoconductive material of the type disclosed in the copending Berman et al. application includes materials such as Ge, BN, $TiO_2$, ZnO, $ZrO_2$, $GeO_2$ $In_2O_3$, $K_2Al_6Si_6O_{22}.2H_2O$, $SnO_2$, $Bi_2O_3$, PbO, BeO, $Sb_2O_5$, $SiO_2$, $BaTiO_3$, $Ta_2O_5$, $TeO_2$, $B_2O_3$, ZnS, and $SnS_2$, for example. Many of these compounds are photoconductive compounds of metals with non-metals of Group VI–A of the Periodic Table, e.g. metallic oxides and sulfides. The materials, suitably in the form of finely-divided water-insoluble particles, may be simply deposited on a substrate such as a glass plate, or dispersed in a self-supporting material such as a plastic foil or the fibrous web of a paper, or dispersed in a suitable binder and coated onto a substrate such as plastic, glass, wood, paper, metal, or other rigid or flexible insulating or conducting materials.

The sensitized photoconductive material is particularly advantageous because it lends itself to high speed printing techniques for both the initial printing of the graph on the strip and the later printing of the corresponding numerical data. It is high speed strip chart recorders which generate the mass of information the present invention particularly aids in digesting.

More specifically, after a strip of this material has been passed through a strip chart recorder and thus activated to form a latent image thereon, subsequent development to form a visible image does not desensitize the photosensitive material thereon. Thus, a border along one edge of the strip may be later exposed to radiation forming the latent images of the desired digital data. The strip may then once again be passed through the developing process to make these data visible.

Alternatively the latent image of the graph may be scanned by a suitable technique described below and after the latent images of the digital data have been placed on the strip a single developing process may be used to render visible both the analog and digital forms of the recorded information.

As shown in FIG. 1, a system embodying the invention includes a strip chart recorder 10 which records in analog form the variations of any monitored parameter. A portion of a strip issuing from the recorder 10 is indicated generally at 12. The analog information recorded thereon is in the form of a graph 14 whose height at any point above a base line 16 extending along the chart corresponds to the value of the monitored parameter at the time the point was recorded by the recorder 10. For example, the parameter may be the output voltage of a particular equipment and each marked division 18 above the base line 16 may correspond to one volt.

With the preferred type of recorder 10, the graph 14 is in the form of a latent image after recording and this image must be developed if the graph is to become visible. That is accomplished by a developer 20 through which the strip 12 passes after leaving the recorder. The strip then passes through a scanner 22 which measures the distance from the base line 16 to the graph 14 at periodically spaced intervals along the strip. Some of the intervals along the base line are shown at **16*a*–16*d* and the corresponding points on the graph are shown at 14*a*–14*d*. Specifically, the scanner optically sweeps laterally across the chart 12 from the base line to the graph and each time it does so, it develops an output indicative of the distance between them. The voltage is analyzed by a data processor 24** which develops a digital signal corresponding thereto.

The digital output of the processor 24 is fed to a printer 26 which prints the digital information on the strip chart 12. An advantageous position for the printed information is along one edge of the strip chart as shown in FIG. 1, with each number disposed at the coordinate defined by the points **16*a* and 14*a* on the base line and the graph, respectively, the height of the graph is 7.10 units above the base line. That is, the voltage measured by the strip chart recorder 10 at the time the point 14*a* was printed was 7.10 volts. Therefore, the number 7.10 is printed on the same longitudinal coordinate as the point 14*a***.

Preferably, the printer 26 is an optical device making use of the photosensitive properties of the chart 12. Such devices exist in the prior art and one particularly useful with the present invention is described below.

Following exposure in the printer 26 the strip chart 12 is fed to a second developer 28 which brings out the latent images of the information printed by the printer 26. If desired the completed chart may then be further processed, by conventional silver halide processing equipment (not shown).

The advantages of the invention will be immediately apparent from a study of the fragmented strip chart 12 of FIG. 1. In the first place, one studying the chart obtains from the graph 14 an immediate visual impression of the general manner in which the monitored parameter varies along the chart. However, a considerable amount of time is required for a translation of the values represented by the graph into numbers, particularly if a reasonable degree of accuracy is required. Moreover, a succession of numbers may be required for a meaningful interpretation of the recorded information. In order to study such a set, one would have to make a series of measurements and record the readings thereof so that a block of such numbers could be viewed together. Even then it is often difficult to correlate the numbers with the graphical analog record. The present invention completely eliminates this problem and thereby greatly facilitates interpretation of the recorded information by positioning the digital information in succession along the chart.

More specifically, since the digital information is positioned opposite the analog record to which it corresponds, one may easily correlate the two types of information. For example, one may be solely interested in the portions of the graph where there are large excursions in the measured quantity. These portions are quickly found by scanning the graph 14 and then the operator may quickly obtain more precise information from the digital information adjacent these portions of the graph.

Another advantage derived by printing the numbers directly on the strip chart relates to the handling of the recorded information. The two types of information are automatically kept in register with each other and they cannot be separated or confused with other records through mishandling.

While the information specifically illustrated on the chart 12 of FIG. 1 numerically registers the values represented by the graph 14 at the corresponding points thereon, it will be apparent that representatives of other features of the graph 14, i.e. the rate of change of the measured quantity, may be of interest. Or it may be desirable to know the average value of the monitored parameter at successive intervals along the chart 12. Such information is readily developed by a digital data processor programmed for this purpose. That is, the data processor 24 may be programmed to provide slope or average information or other data associated with the graph 14 and the printer 26 will print such data at the proper positions along the chart.

An advantage of the use of a photosensitive simiconductor as the recording medium is that one set of numbers can be developed and printed and the chart 12 can then be reinserted into the scanner 22, with the processor 24 programmed for a different operation resulting in the printing of a second set of digits. The second, and even further such operations need not be performed immediately after the first operation, since the recording medium retains its sensitivity even after passage through the developer 28.

Alternatively, the data processor 24, if of a high speed electronic type, can perform a number of calculations essentially simultaneously so that a plurality of sets of digits can be printed on the chart 12 at substantially the same time.

As shown in FIG. 2*a*, one form which the scanner 22 may take comprises a cathode ray tube 30 arranged to form a line on its screen transverse to the strip chart 12. That is, the electron beam in the tube 30 forms a spot which moves across the face of the tube in a direction corresponding to movement from an edge **12*a* of the strip chart to the opposite edge 12*b*. This line is converged by a lens 32 on a photo detector 34 disposed on the opposite side of the chart 12. Thus, each time the electron beam in the cathode ray tube 30 begins a sweep across the face of the tube a corresponding beam of light begins a sweep across the chart 12 from the edge 12***a* to the edge 12*b*. Some of the light impinging on the chart passes through it and is detected by the detector 34.

The detector 34 is followed by an amplifier 36 and a differentiator 38. The output of the differentiator registers the passage of the light beam across the base line 16 and the graph 14. Specifically, as the beam passes over first the base line and then the graph there is a sudden change in the amount of light transmitted through the strip chart and the resulting change in the electrical output of the photo detector 34 is passed by the differentiator 38 in the form of a pulse.

The pulses from the differentiator 38 are fed to the complement input of a flip-flop 40 by way of a gate 42. When the flip-flop 40 is set it enables a gate 44 which passes pulses from a clock 46 to a counter 48. Thus, assuming that the flip-flop 40 is initially reset and the gate 42 is enabled, the passage of the light beam over the base line 16 will cause a first pulse to be applied to this flip-flop, thereby setting it and enabling the gate 44. The counter 48 then begins to count pulses from the clock 46.

The passage of the beam over the graph 14 then resets the flip-flop 40, thereby disabling the gate 44 and stopping the flow of clock pulses to the counter 48. The content of the counter 48 is a digital indication of the time it took for the light beam to sweep from the base line to the graph. Assuming that the sweep rate of the light beam is known, the counter content is a digital indication of the height of the graph above the base line and therefore, the quantity represented by the graph. The content of the counter 48 may therefore be directly processed by the data processor 24.

The scanner 22 also includes a sweep generator 50 which applied a deflection signal to the cathode ray tube 30. Initiation of each sweep is begun by a signal from a trigger 52, which may be associated with the clock 46 so as to initiate successive sweeps at a periodic interval. Alternatively, the trigger 52 may be connected with the transport mechanism (not shown) feeding the chart 12 past the cathode ray tube 30. In this way, the sweeps may be spaced at successive equal intervals along the chart, regardless of variations in the speed of transport.

Shortly after each sweep is initiated by the trigger 52, a signal from the trigger, delayed slightly by a delay unit 54, sets a flip-flop 56 to enable the gate 42. Shortly before the end of each sweep and after the light beam has passed the maximum possible height of the graph 14 above the base line 16, a second signal from the trigger, further delayed by a delay unit 58 resets the flip-flop 56. This disables the gate 42 and prevents spurious signals from reaching the flip-flop 40. Finally, after a further delay provided by a delay unit 60 to permit readout of the counter 48 to the data processor 24, the trigger signal is applied to a reset input of the counter to reset the counter and thus prepare it for the next scan of the chart 12. This last signal is also applied to a reset input of the flip-flop 40 to ensure that this flip-flop is in the proper state for the beginning of the next scan.

Exact correspondence of the change of position of the light beam on the chart 12 with the content of the counter 48 may be obtained by constructing the sweep generator 50 as a counter whose content is applied to a digital-to-analog converter, with the output of the converter being the deflection signal for the cathode ray tube 30. The counter in the sweep generator would count pulses from the clock 46 and thus for each increment in the counter 48 there would be a corresponding increment in the position of the light beam. In fact, if the position of the base line 16 is fixed, the counter 48 can serve the additional function of the sweep generator counter. The specific details of such an arrangement will be apparent to those skilled in the art.

With reference to FIG. 2*b*, the printer 26 comprises a character generator using a cathode ray tube 62 as the light producing element. The image on the face of the cathode ray tube is converged onto a photo detector 64 on the opposite side of the character mask 66 by a lens 68. The character mask may, by way of illustration, be a transparent sheet on which are printed in different positions the various characters to be recorded on the chart 12.

A character scan generator 70 applies a time varying signal to the deflection elements of the tube 62 to form a conventional raster on the face of the tube, the raster being of such size that when reduced by the lens 68 it fits the individual characters on the mask 66. A character selection circuit 72 adds to the signal from the generator 70 a signal which positions the raster on the face of the tube 62 according to position of the selected character on the mask 66. By way of example, the data processor 24 may be programmed to provide, in digital form, vertical and horizontal deflection signals corresponding to the position of the selected character. The selection circuit 72 may then comprise a pair of digital-to-analog converters which transform these signals into suitable deflection signals.

Accordingly, the output of the detector 64 is a video signal corresponding to the changes in the intensity of the light impinging thereon resulting from the scanning of the selected character by the light beam from the cathode ray tube 62. This signal is amplified by an amplifier 74 and applied to a Kerr cell modulator 76 which passes light from an ultraviolet light source 78.

The output of the modulator 76 is passed through a converging lens 80 and then reflected by vertical and horizontal deflection mirrors 82 and 84 to a point on the chart 12. The mirrors 82 and 84 move in synchronism with the light beam scanning the character in the mask 66 and thus the ultraviolet beam impinging on the chart traces out the selected character.

More specifically, the mirrors may be the reflecting elements of mirror galvanometers whose motors are indicated schematically at 86 and 88. The character scan generator 70 applies the raster-forming signals to these motors so that one of them receives the vertical deflection signal and the other the horizontal deflection signal. The combined result is to move the ultraviolet beam in a pattern identical to the raster formed on the face of the cathode ray tube 62.

Assuming a multiple character readout on the tape 12, e.g. the three digit numbers shown in FIG. 1, the light beam from the printer must be properly indexed for successive characters in each set. This is accomplished by a suitable signal from the data processor 24 which presents in digital form the position of each character. The position signal is passed through a position selector 90 which may take the form of a digital-analog converter providing a biasing signal for the motor 88. This biasing signal indexes the mirror 84 to position the printed character at the correct location.

It should be noted that if the chart 12 is driven at high speeds, it may be desirable to skew the sweep on the cathode ray tube 30 so that the light beam used to scan the chart 12 moves directly across the chart, i.e. perpendicularly to the base line 16. A similar orientation of the printer may be desirable to reduce distortion of the character printed thereby.

Preferably, the recorder 10, developer 20, scanner 22, printer 26 and developer 28 are enclosed in a housing 92 to prevent extraneous light from activating the photosensitive surface of the strip chart 12 prior to final development of the images thereon.

Preferably, the light used by the scanner 22 to scan the strip chart 12 is of a wavelength to which the strip 12 is insensitive. Otherwise the scanning beam will leave a latent image which may have to be erased before the printer 26 operates on the strip. Erasure can be accomplished by allowing the latent image to decay, a process which is speeded up by exposure to the atmosphere and also to elevated temperatures.

Alternatively, the latent image traced out by the scanning beam may be retained and later developed to indicate the precise position on the graph related to each printed character.

Moreover, in a further embodiment of the invention, the developer 20 may be omitted, with the activated chart passing directly from the recorder 10 to the scanner 22. This embodiment makes use of the fact that the latent images formed on the preferred sensitized photoconductive recording medium manifest differential transmission and reflection of infrared light. Thus, the scanner 22 may scan the chart with an infrared beam to develop the information used by the data processor 24 in controlling the printer 26. The developer 28 then makes permanent images of both the graph 14 and the characters recorded by means of the printer 26. Since the latent image has a life of only a few minutes in the presence of the atmosphere, the entire process should be carried out as soon as the image of the graph 14 has been formed by the strip chart recorder if this alternative embodiment of the invention is to be employed.

It will be apparent that in certain applications the additional data processor 24 of FIG. 1 may be omitted. For example, the content of the counter 48 of FIG. 2*a* might be fed directly to the character selector 72 of FIG. 2*b*. The mask 66 could then have three-digit "characters" selected by the selector 72 for a three-digit readout of the type shown in the drawings. The resulting high speed of operation facilitates the use of another feature of the system. Specifically, the preferred scanner and printer may be in essentially the same location. Since they are projective devices, they may operate on the same portion of the chart simultaneously, without interfering with each other's operation. Thus, information corresponding to the scanning operation may be printed immediately, thereby largely eliminating the need for a buffer storage system to accommodate data between scanning and printing.

In addition to the types of data described above, the invention may be used to print analog information of various types. This is particularly helpful in developing corrected references for use in studying the recorded information. For example, in the case of a simple graph a corrected base line may be required; or perhaps the scale may need correction, in which case the system can overprint a scale on the chart. Such corrective information is often developed by processing the information on the chart with information from other sources.

As another example, consider a photograph having varying distortion throughout. If it is desired to measure distances from the photograph, the scale at the point of measurement must be known. This problem is solved, in accordance with the present invention, by making the photograph on a photoconductive medium of the above type, scanning the photograph to compare apparent distances thereon with known values, processing this information to develop data concerning a scale grid which varies over the photograph, and then overprinting the scale on the photograph.

It will thus be seen that the objects set forth above among those made apparent from the preceding description, are efficiently attained, and since certain changes may be made in the constructions set forth without departing from the scope of the invention, it is intended that all matter contained in the above description or shown in the accompanying drawings shall be interpreted as illustrative and not in a limiting sense.

It is also be understood that the following claims are intended to cover all of the generic and specific features of the invention herein described, and all statements of the scope of the invention which, as a matter of language, might be said to fall therebetween.

Having described the invention, what is claimed as new and desired to be secured by Letters Patent is:

1. A converter comprising:
(A) a strip having a photosensitive surface containing a recording medium and having a graph recorded thereon;
(B) means for scanning said strip at successive positions therealong to provide electrical signals indicative of the values recorded on said graph at said positions;
(C) said medium being of a type which is rendered chemically active in areas exposed to a radiation pattern, thereby to form a latent image of said pattern;
(D) means responsive to said signals for printing at said positions characters representing a feature of said graph at the respective positions.

2. The combination defined in claim 1 wherein said printing means is arranged to form radiation patterns on said medium of the character to be printed on said strip.

3. The combination defined in claim 1 in which said medium is a photoconductor itself sufficient as a photosensitive component of said medium.

4. A data converter for use with a chart containing optically sensitive photoconductive material, said converter comprising
(A) a recording medium of a type which is rendered chemically active in areas exposed to a radiation pattern, thereby to form a latent image of said patern,
(B) a recorder forming on said medium a radiation pattern representing values of a monitored parameter,
(C) a scanner arranged to scan said medium at various positions thereon to provide electrical signals indicative of a feature of said pattern at said position,
(D) means responsive to said signals for forming at said positions optical images of information representing a feature of said pattern at the respective positions, and
(E) a developer for developing the latent image of said images formed by said printing means.

5. The combination defined in claim 4 including a second developer arranged to develop the latent image provided by said recorder prior to scanning of said chart by said scanner.

6. The combination defined in claim 5 in which
(A) said medium is a strip chart,
(B) said recorder forms a graph on said chart, and
(C) said scanner includes
(1) means for sweeping a beam of light across said medium at said positions,
(2) means for detecting the change in the manner in which said strip chart operates on said beam when said beam crosses said graph, and
(3) means responsive to said detecting means for developing an electrical signal indicative of the displacement of said beam across said strip chart when it traverses said graph.

7. The combination defined in claim 6 in which said printing means includes
(A) a character mask containing the various characters to be printed on said strip chart,
(B) means sweeping a beam of light over a selected character on said mask whereby said character operates on said beam,
(C) means forming an electrical signal corresponding to the intensity of light operated on by said character,
(D) means for forming at a selected location on said strip chart a raster of light to which said semiconductor material is sensitive, and
(E) means modulating the intensity of said raster forming means in response to said signal to provide in said raster an optical image of said selected character.

8. A data processing system comprising ing medium to provide signals indicative of a first set of data recorded in said image, (B) means for converting said first set of data to a second set, and (C) means for recording said second set on said first set by imaging said second set on said medium, thereby to provide a composite representation of said sets of data on the same medium.

9. A data processing system comprising (A) an image-carrying recording medium, said medium being of a type which is rendered chemically active in areas exposed to a radiation pattern, thereby to form a latent image of said pattern, (B) means for scanning said medium to provide signals indicative of a first set of data recorded in said image, (C) means for converting said first set of data to a second set, and (D) means for recording said second set on said first set by imaging said second set on said medium, thereby to provide a composite representation of said sets of data on the same medium.

10. The combination defined in claim 9 in which said medium is a photoconductor itself sufficient as a photosensitive component of said medium.

References Cited

UNITED STATES PATENTS

| | | | |
|---|---|---|---|
| 2,931,566 | 4/1960 | Strassner | 235—61.6 |
| 3,098,689 | 7/1963 | Caflisch et al. | 346—33 |

ROBERT C. BAILEY, *Primary Examiner.*

G. D. SHAW, *Assistant Examiner.*